United States Patent [19]

Lamb

[11] 4,092,248
[45] May 30, 1978

[54] PUMP-FILTER ASSEMBLY

[75] Inventor: Richard C. Lamb, Plantsville, Conn.

[73] Assignee: Koehler-Dayton, Inc., New Britain, Conn.

[21] Appl. No.: 816,588

[22] Filed: Jul. 18, 1977

[51] Int. Cl.² .............................................. B01D 29/38
[52] U.S. Cl. .................................. 210/152; 210/315; 210/333 R; 210/416 R
[58] Field of Search ............... 210/152, 315, 357, 410, 210/416 R, 333 R

[56] References Cited

U.S. PATENT DOCUMENTS

| | | | |
|---|---|---|---|
| 3,067,433 | 12/1962 | Dietz et al. | 210/357 |
| 3,342,341 | 9/1967 | Lee | 210/357 |
| 3,429,445 | 2/1969 | Lee | 210/357 |
| 3,473,171 | 10/1969 | Palmer | 210/357 |
| 3,855,641 | 12/1974 | Foster et al. | 210/152 X |

Primary Examiner—John Adee

Attorney, Agent, or Firm—Spencer T. Smith

[57] ABSTRACT

A pump-filter assembly for a recirculating toilet comprising, an axial flow pump including a support tube and a drive shaft supported therein, means for rotating the drive shaft in first and second opposite directions, a first impeller secured to the drive shaft, the impeller being selectively configured to pump when the drive shaft is rotated in the first direction and to forcefully draw in air when the drive shaft is rotated in the second direction, the drive shaft extending below the support tube, a second impeller supported on the drive shaft at a location below the support tube for free-wheeling rotation thereon, a ratchet mechanism secured to the portion of the drive shaft extending below the support tube, and a pawl mechanism secured to the second impeller means for selective driving engagement with the ratchet mechanism when the drive shaft is driven in the opposite second direction, and filter means surrounding the axial flow pump.

3 Claims, 2 Drawing Figures

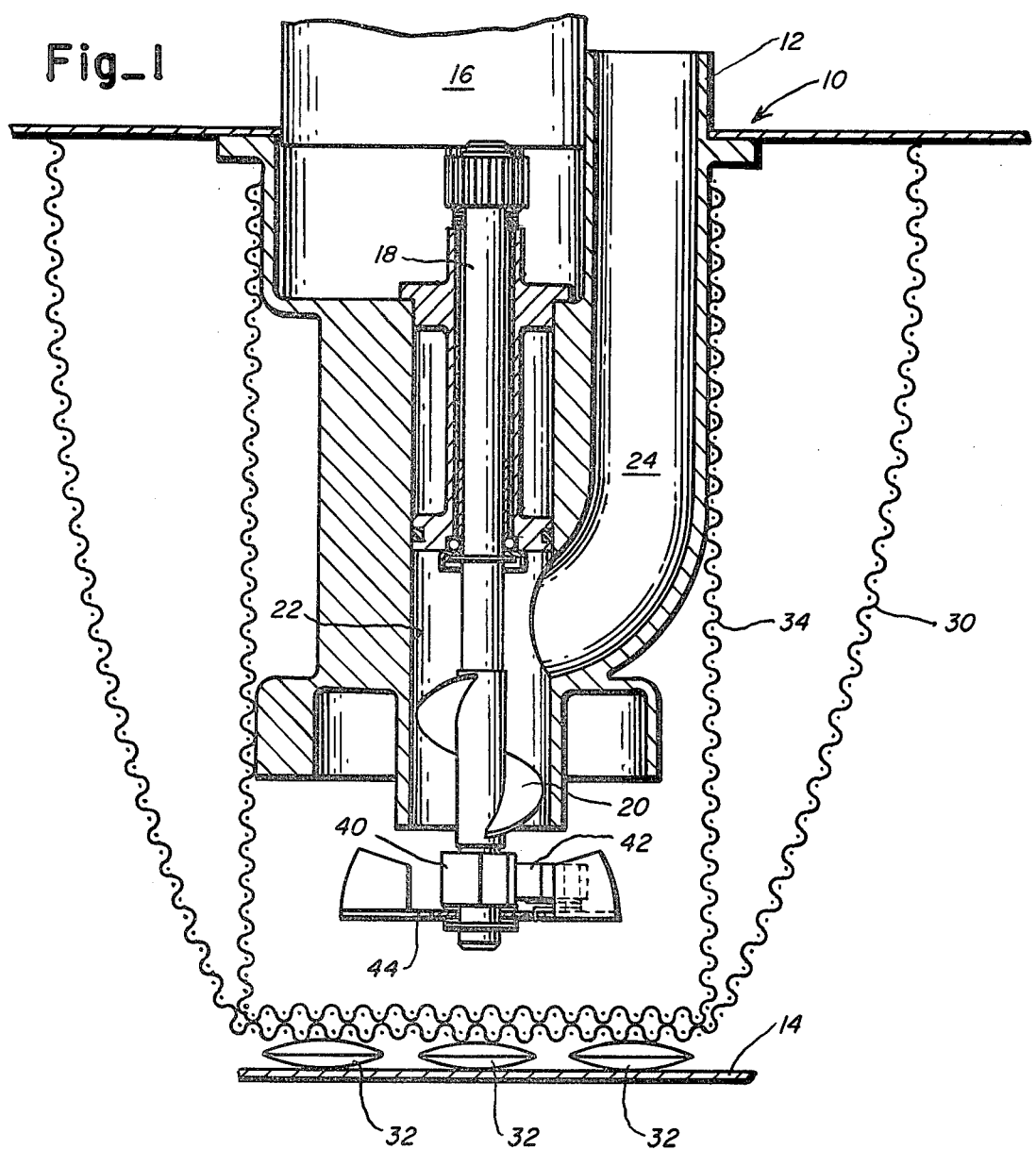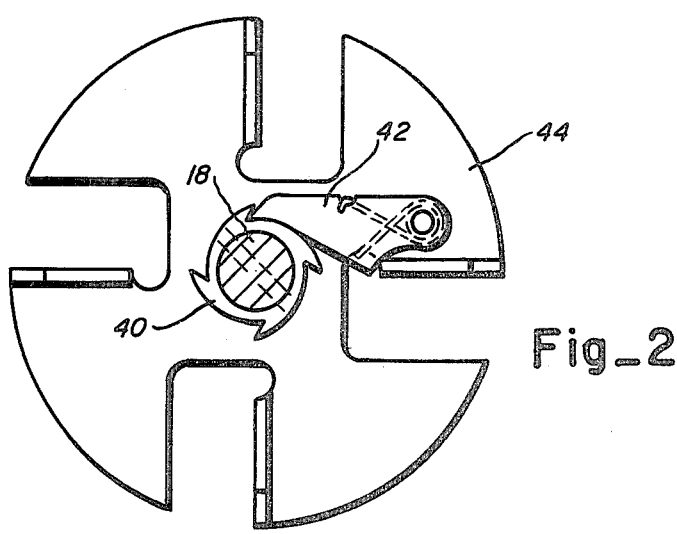

PUMP-FILTER ASSEMBLY

The present invention relates to recirculating toilets and more particularly to the pumps utilized for flushing these toilets. In these toilets, the flushing medium must be filtered during the flushing cycle to prevent the introduction of solid particles into the bowl.

In a recirculating toilet such as is disclosed in U.S. Pat. No. 3,067,433, assigned to the assignee of the present invention, a recirculating pump is employed for flushing the bowl into a storage tank. Preferably, the pump is an axial flow pump having a vertically extending cylindrical pumping chamber with a lower axially extending inlet and an upper radially extending outlet. It has been found that an axial flow pump is ideally suited for use in a recirculating toilet since it provides high volume flow at relatively low pressure and is quiet during operation. An axial flow screw-type impeller is positioned within the pumping chamber and is supported by the lower end portion of a vertically extending shaft connected to a drive motor.

Surrounding the lower inlet of the pump is a cup-shaped filter which is constructed of a series of rings spaced to define peripheral slots therebetween. The filter is driven by an auxiliary drive shaft connected to the drive motor and is effectively cleaned by a series of stationary scraper or wiper blades projecting inwardly into the slots. The pump is controlled to operate in reverse and thus to force liquid outwardly through the filter for clearing solids which may have collected on the filter prior to forward operation of the pump to supply flushing liquid to the bowl. It is also possible to hold the filter body stationary and rotate the wipers, as in U.S. Pat. No. 3,342,341.

It has also been proposed to alternate the direction of rotation of the motor and filter during successive cycles and to this end, a novel axial flow impeller which is effective to pump liquid always in one direction regardless of its direction of rotation was developed and disclosed in U.S. Pat. No. 3,478,690.

The filter baskets disclosed in U.S. Pat. No. 3,067,433 were complex and costly and were replaced by a self-cleaning filter disclosed in U.S. Pat. No. 3,429,445.

Secondary filters intended to prevent bulk waste from coming into contact with the filter basket have also been utilized and with secondary systems for cleaning these secondary filters have been utilized to maintain the integrity of these secondary filters (See U.S. Pat. No. 3,855,641).

It is accordingly an object of the present invention to provide a filtering system for an axial flow pump in a recirculating toilet which is low-cost, yet efficiently operable for prolonged periods without additional maintenance.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings:

FIG. 1 is an elevational view of an axial flow pump-filter assembly utilized in a recirculating toilet; and FIG. 2 is an enlarged view of a portion of the axial flow pump-filter assembly illustration in FIG. 1.

The pump-filter assembly 10 includes a housing 12, which is secured to a collecting tank 14 of a recirculating toilet, or the like, and a motor 16 mounted thereon for rotationally driving an elongated drive shaft 18 having an impeller 20 secured thereto. The drive shaft is mounted in a downwardly extending support or macerator tube 22.

When the impeller is rotated in a selected direction, fluid will be pumped from the collecting tank 14 upwardly through the macerator tube 22 into a discharge conduit 24 for delivery to a toilet bowl manifold, or the like, (not shown). When the drive shaft is rotated in a second or opposite direction, air will be sucked down, the discharge conduit 24 and discharged from the macerator tube 22.

The pump-filter assembly includes a first cup-shaped filter 30 made of number 4 mesh screen which extends between the top and bottom walls of the collecting tank. Rubber supporting buttons 32 are located on the base portion of this first filter. Within this filter is located a second cylindrical filter 34, made from number 8 mesh screen, open at the top, which extends from the top of the collecting tank to the base of the first filter 30. The second filter is maintained in position by the pump housing 12 and it in turn maintains the first filter 30 in proper position.

Secured to the bottom of the drive shaft 18 is a ratchet mechanism 40, which rotates with the shaft and a spring biased pawl mechanism 42, which will be driven by the ratchet when the shaft is rotated in the second direction, and which will free-wheel when the drive shaft is rotated in the first direction. The pawl mechanism 42 is secured to a four-bladed impeller 44 which is supported, but not driven, by the bottom portion of the drive shaft 18. When the pump impeller is rotated to drive the pawl mechanism, the air, which is sucked down through the exhaust conduit 24, will be expelled proximate the four-bladed impeller where it will be aerated to violently pass through the first 30 and second 34 filters thoroughly cleaning them. Preferably, the shaft is reversely driven for a selected period of time after each pumping period to cleanse these filters thereby maintaining the pump-filter assembly in peak condition.

What is claimed is:

1. A pump-filter assembly for a recirculating toilet comprising
   an axial flow pump including a support tube and a drive shaft supported therein,
   means for rotating the drive shaft in first and second opposite directions,
   a first impeller secured to said drive shaft, said impeller being selectively configured to pump when said drive shaft is rotated in the first direction and to forcefully draw in air when said drive shaft is rotated in the second direction,
   said drive shaft extending below said support tube,
   a second impeller supported on said drive shaft at a location below said support tube for free-wheeling rotation thereon,
   a ratchet mechanism secured to the portion of said drive shaft extending below said support tube, and
   a pawl mechanism secured to said second impeller means for selective driving engagement with said ratchet mechanism when said drive shaft is driven in the opposite second direction, and
   filter means surrounding said axial flow pump.

2. A pump-filter assembly according to claim 1 wherein said filter means comprises first and second filters.

3. A pump-filter assembly according to claim 2 wherein said first and second filters are made of screen and the filter proximate to said axial flow pump is of finer mesh than the other filter.

* * * * *